United States Patent [19]

Lee

[11] Patent Number: 4,712,294

[45] Date of Patent: Dec. 15, 1987

[54] METHOD OF FORMING A HELICAL WAVE GUIDE ASSEMBLY BY PRECISION COINING

[75] Inventor: George M. Lee, Redondo Beach, Calif.

[73] Assignee: Hughes Aircraft Company, Los Angeles, Calif.

[21] Appl. No.: 18,852

[22] Filed: Feb. 24, 1987

Related U.S. Application Data

[63] Continuation of Ser. No. 789,882, Oct. 21, 1985, abandoned.

[51] Int. Cl.[4] ........................ H01P 11/00; B23P 11/00

[52] U.S. Cl. ........................................ 29/600; 29/517

[58] Field of Search ................. 29/453, 517, 518, 519, 29/559, 600, 423; 72/48; 315/3.5

[56] References Cited

U.S. PATENT DOCUMENTS

| | | | |
|---|---|---|---|
| 2,235,255 | 3/1941 | Durant | 29/517 |
| 2,943,228 | 6/1960 | Kleinman | 315/3.5 |
| 3,514,843 | 6/1970 | Cernik | 29/559 |
| 3,540,119 | 11/1970 | Manoly | 29/600 |
| 3,551,999 | 1/1971 | Gutmann | 29/517 |
| 4,071,834 | 1/1978 | Comte | 29/600 X |
| 4,270,069 | 5/1981 | Wiehler | 29/600 X |
| 4,503,602 | 3/1985 | Hillmann | 29/517 X |

FOREIGN PATENT DOCUMENTS 984607 2/1965 United Kingdom .

*Primary Examiner*—E. Michael Combs

*Attorney, Agent, or Firm*—Paul M. Coble; A. W. Karambelas

[57] ABSTRACT

Helical slow-wave structure (10) carrying three ceramic support rods (12, 14, 16) is inserted with clearance into the bore (22) of malleable barrel (20). Dies (24, 26) close around the barrel to malleably coin the barrel and close it down around the support rods to engage the support rods by interference fit to accurately support the helix (10) and provide thermal conductivity therefrom.

5 Claims, 3 Drawing Figures

METHOD OF FORMING A HELICAL WAVE GUIDE ASSEMBLY BY PRECISION COINING

This invention was made with Government support under Contract No. F30602-82-C-0159 awarded by the Department of the Air Force. The Government has certain rights in this invention.

This application is a continuation of application Ser. No. 789,882, filed Oct. 21, 1985, now abandoned.

BACKGROUND

This invention is directed to a precision coining method particularly useful in coining the slow-wave structure of a traveling-wave tube and to the resulting coined helix assembly.

In electron beam tubes of the traveling-wave type, a stream of electrons in an electron beam is caused to interact with a propagating electromagnetic wave in a manner which amplifies the electromagnetic wave energy. In order to achieve the desired interaction, the electromagnetic wave is propagated along a slow-wave structure, such as an electrically conductive helix wound around the path of the electron beam. The slow-wave structure provides a path of propagation for the magnetic wave which is considerably longer than the axial length of the structure so that the traveling wave may be made to effectively propagate at nearly the velocity of the stream of electrons in the electron beam. Slow-wave structures of the helix type are usually supported within an encasing barrel by means of a plurality of (usually three) equally circumferentially spaced electrically insulating rods positioned around the helix and within the barrel.

One prior method of mounting the helix with its slow-wave structure and support rods within the barrel has been to triangulate the barrel. Initially the barrel is circular in section and it is thereupon distorted by applying forces to three points around its circumference to alter its section from circular toward triangular. When distorted in that manner, the helical slow-wave structure with its support rods is inserted into the distorted barrel. Upon removal of the distorting force, the barrel resiliently returns toward its original shape and, in doing so, compresses the rods and the slow-wave structure into a rigid assembly. This is described in U.S. Pat. No. 2,943,228 to Bernard Kleinman. An improvement thereon is disclosed in U.S. Pat. No. 3,514,843 to George Cernik.

Another way of achieving the compressed helix assembly is to mount the support rods on the helix of the slow-wave structure and retain that portion at room temperature or below. The metallic barrel has an initial inside diameter which is smaller than the circumscribing circle around the support rods so that, if assembled with those dimensions, there would be an interference fit. The barrel is heated and it is made of a material, such as copper, which expands upon heating. When an inside diameter is reached which is sufficiently large to receive the helix with its support rods, the helix and its support rods are inserted therein. Upon cooling, the barrel reduces in size to embrace the helix with its support rods in an interference fit.

Increasing frequency and reduction in wavelength at which the traveling-wave tubes operate have resulted in requirements for smaller slow-wave structures. The above-described methods for securing the slow-wave structure in its barrel are useful when the structures are of larger size. However, with reduction in size due to shorter wavelength, the prior assembly methods of triangulation and heat shrinking have not been completely satisfactory for assembling the helical slow-wave structure and its support rods into the barrel.

SUMMARY

In order to aid in the understanding of this invention, it can be stated in essentially summary form that it is directed to a precision coining method and corned helix assembly wherein the helical slow-wave structure carrying its support rods is inserted into a tubular barrel having an internal diameter greater than the circumscribing circle around the support rods. After insertion, the barrel is inserted into a press having suitable dies and the barrel is malleably deformed to reduce the inside diameter to embrace the rods on the helical slow-wave structure in an interference fit.

It is, thus, a purpose and advantage of this invention to provide a method whereby a helical slow-wave structure with its support rods can be engaged in its barrel with an interference fit, especially in small sizes required for high frequency.

It is a further purpose and advantage of this invention to provide a coined assembly wherein a malleable metal barrel is coined around a helix with its support rod to embrace the support rods and engage them with an interference fit.

It is a further purpose and advantage of this invention to provide a method by which a helical slow-wave structure with its support rods can be engaged in a metallic barrel with an interference fit where the barrel initially has an inside diameter larger than the circumscribing circle around the support rods and is thereafter coined in a die to embrace the support rods with an interference fit.

Other purposes and advantages of this invention will become apparent from a study of the following portion of the specification, the claims and the attached drawings.

DESCRIPTION OF THE PREFERRED EMBODIMENT

Figure 1:
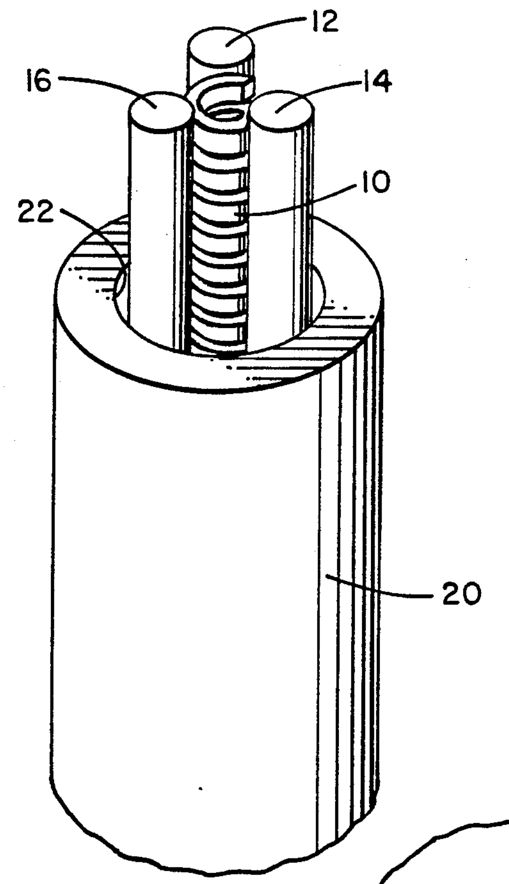
FIG. 1 is an isometric view of the helical slow-wave structure with its attached support rods going into the barrel.
Figure 3:
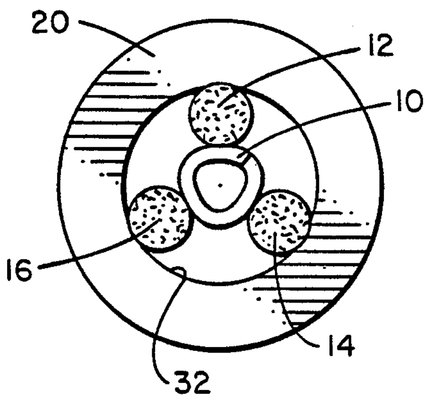
FIG. 3 is an end view of the assembly after coining, showing the finished assembly and its interference fit.
Figure 2:
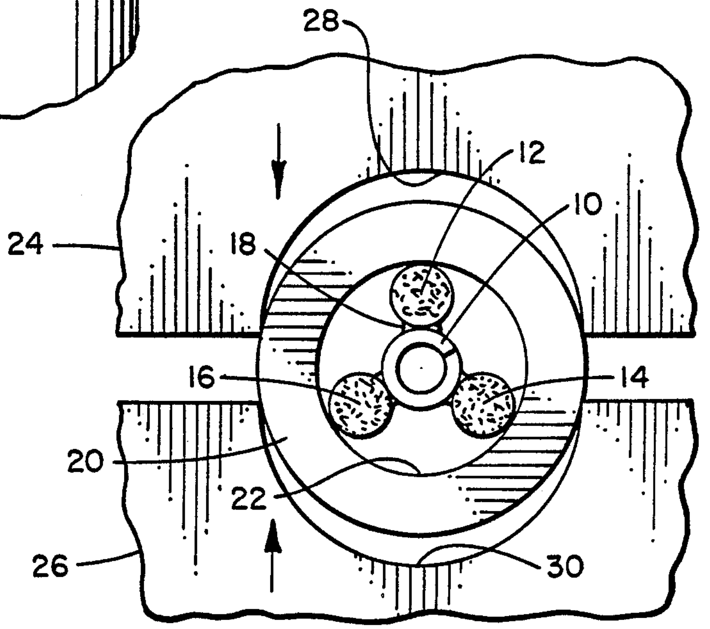
FIG. 2 shows the assembly between dies, with closure of the dies about to malleably coin the barrel around the helical slow-wave structure and its support rods for an interference fit.

Helical slow-wave structure 10 is shown in FIGS. 1, 2 and 3. The slow-wave structure is made of a rectangular metal ribbon, usually tungsten, wound into a helix to define an interior passage through which the electron beam passes. The passage for the electron beam is of circular section. The external surface of the helix 10 is also of circular section. The helix is straight. In order to maintain the helix of the slow-wave structure 10 in position, it is supported by three support rods 12, 14 and 16. The support rods are made of dielectric material, and beryllium oxide ceramic material is preferred. The support rods are in the forms of right circular solid cylinders. The support rods lie around slow-wave structure 10 to be spaced at equal angles. Thus, the support rods 12, 14, and 16 are spaced 120 degrees apart around the axis through the center of the slow-wave structure. The support rods are attached to the slow-wave structure by means of dielectric glue. The glue is illustrated in FIG. 2 where glue spot 18 is specifically identified as attaching support rod 12 to slow-wave structure 10. The support rods are glued to the slow-wave structure in a fixture so as to create a subassembly which is sufficiently strong for handling. Methyl methacrylate is preferred as the glue material.

Barrel 20 is a metallic tube in the form of a right circular cylindrical tube. It is made of malleable metal, such as oxygen-free high conductivity copper. For a slow-wave structure suitable for use in the range from 43 to 46 gigahertz, the barrel 20 has an initial outside diameter of 0.1078 inch and an initial inside diameter of its inner cylindrical surface 22 of 0.0700 inch. The circumscribing circle around the support rods 12, 14 and 16 provides a diametrical clearance within the barrel of 0.0007 inch so that the circumscribing circle is 0.0693 inch. While both the subassembly and the barrel are at room temperature, the subassembly is inserted into the barrel. This step is shown in FIG. 1.

After the subassembly is properly positioned in the barrel, the barrel is squeezed between dies to malleably deform and coin the barrel around the subassembly. FIG. 2 shows upper and lower dies 24 and 26 which respectively have upper and lower cavities 28 and 30 facing each other. The cavities 28 and 30 form a right circular cylinder when the dies are closed together, with the parting line lying on the axis of the cylinder. The diameter of the cavity, when closed, is 0.1070 inch.

As the next step, the subassembly and barrel are placed in the open die and the die is closed. The closing of the die coins and malleably deforms the barrel around the subassembly to squeeze the barrel around the subassembly. The squeezing of the barrel closes down the ceramic rods, which have a high modulus, and this positioning resiliently deforms the metallic helix 10. The distortion is over-shown in FIG. 3 for emphasis. The resiliency of the metallic helix 10 maintains the stress over normal temperature cycling. After the die closing and squeezing is complete, the outside diameter of the barrel is 0.1070 inch to 0.1071 inch. After squeezing, there is about 0.0006 inch interference between the now smaller inner surface 32 and the support rods 12, 14 and 16. This interference is seen in FIG. 3. FIG. 3 is a view of the completed assembly.

After removal from the die, the completed assembly of FIG. 3 is flushed with hot acetone to remove the methyl methacrylate glue. Thereupon, the assembly is placed into a traveling-wave tube. The large contact area between the support rods and the barrel is necessary for proper heat transfer out away from the slow-wave structure. In addition, the stressed helix provides force on the rods to maintain the helical slow-wave structure in place, upon its proper axis. Through the use of this precision coining method, a coined helix assembly is produced in small sizes which cannot be produced by prior conventional methods. The plastically deformed copper barrel provides precision placement of the slow-wave structure and proper compression of the support rods onto the helix of the slow-wave structure so that the compressed helix maintains the return force over temperature cycling. The process is fast and accurate so that increased yield is achieved. In addition, the small sizes are now producible with accuracy.

The compression of the barrel and the slow-wave structure with its supporting rods therein is controlled by employing dies having the desired cavity diameter, in accordance with the size of the parts. An adequate length can be readily achieved. The sizes given are to provide a specific example of the process and article. Other sizes and shapes can be produced by employing different starting parts and dies. Such are within the scope of this invention.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. The method of securing a slow-wave structure in the barrel of a traveling-wave tube comprising the steps of:

mounting a helical slow-wave structure between at least three support rods having a circumscribing circular dimension;

placing the helical slow-wave structure with its support rods into a tubular barrel having an interior diameter greater than the diameter of said circumscribing circular dimension;

inserting the tubular barrel within a die having opposing faces which when the die is closed define a right circular cylinder of a diameter slightly less than the initial outer diameter of the barrel; and closing the die to directly coin the barrel around the support rods such that the interior size of the barrel is reduced to a diameter less than that of said circumscribing circular dimension to engage the support rods which in turn resiliently compress and deform without axially elongating or changing the pitch of the helical slow-wave structure such that the compressed helical slow-wave structure maintains a return force on the rods to firmly hold the helical slow-wave structure and the support rods within the barrel.

2. The method of claim 1 including the preliminary step of:

attaching the rods to the helical slow-wave structure by means of gluing before insertion of the helical slow-wave structure and the rods into the barrel.

3. The method of claim 2 further including after the coining step the step of:

removing the glue from between the helical slow-wave structure and the rods.

4. The method of mounting a helical slow-wave structure within a tubular barrel for use in a traveling-wave tube comprising the steps of:

attaching three ceramic rods to the exterior of a metal helical slow-wave structure equally spaced around the slow-wave structure so as to define a circumscribing right circular cylinder having an axis coincident with the axis of the helical slow-wave structure and having a diameter which includes the support rods to form a subassembly;

inserting the subassembly of rods and helical slow-wave structure into a right circular cylindrical tubular malleable metallic barrel having an inside diameter slightly larger than the diameter of said circumscribing cylinder;

inserting the barrel with its enclosed subassembly into a die which when closed defines a cylindrical cavity of a diameter slightly smaller than the initial outside diameter of the barrel;

and closing the die to directly coin the barrel around the ceramic support rods to a barrel inside diameter smaller than said circumscribing cylinder so as to engage the support rods which in turn resiliently compress and deform without axially elongating or changing the pitch of the helical slow-wave structure such that the compressed helical slow-wave structure maintains a return force on the rods to form an interference fit between the support rods and the barrel, thereby supporting the helical slow-wave structure and providing heat transfer therefrom.

5. The method of claim 3 further including the steps of:

cleaning the slow-wave structure assembly; and inserting the slow-wave structure assembly into a traveling-wave tube.

* * * * *